United States Patent
Bedi et al.

(10) Patent No.: US 10,958,753 B2
(45) Date of Patent: *Mar. 23, 2021

(54) OPERATING DISTRIBUTED COMPUTER SYSTEMS

(71) Applicant: Bank of America Corporation, Charlotte, NC (US)

(72) Inventors: Kamaljeet Singh Bedi, New Delhi (IN); Anurajam Rajagopalan, Tamilnadu (IN); Jyoti Ranjan Mohapatra, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/576,999

(22) Filed: Sep. 20, 2019

(65) Prior Publication Data

US 2020/0014773 A1  Jan. 9, 2020

Related U.S. Application Data

(63) Continuation of application No. 15/675,890, filed on Aug. 14, 2017, now Pat. No. 10,425,496.

(51) Int. Cl.
*H04L 29/08* (2006.01)
*H04L 12/24* (2006.01)
*G06F 9/54* (2006.01)
*H04L 29/14* (2006.01)

(52) U.S. Cl.
CPC ............ *H04L 67/2842* (2013.01); *G06F 9/54* (2013.01); *H04L 41/083* (2013.01); *H04L 67/10* (2013.01); *H04L 67/104* (2013.01); *H04L 67/1097* (2013.01); *H04L 69/40* (2013.01)

(58) Field of Classification Search
CPC ......... G06F 9/54; H04L 41/083; H04L 67/10; H04L 67/104; H04L 67/1097; H04L 67/2842; H04L 69/40
See application file for complete search history.

(56) References Cited

U.S. PATENT DOCUMENTS

| | | | |
|---|---|---|---|
| 7,555,459 B2 | 6/2009 | Dhar et al. | |
| 7,698,230 B1 | 4/2010 | Brown et al. | |
| 8,949,706 B2 | 2/2015 | McCabe et al. | |
| 9,634,975 B2 | 4/2017 | McCabe et al. | |
| 2009/0066540 A1* | 3/2009 | Marinakis | H05B 47/22 340/909 |
| 2010/0262822 A1* | 10/2010 | Honjo | H04L 67/2842 713/153 |

(Continued)

*Primary Examiner* — Gil H. Lee
(74) *Attorney, Agent, or Firm* — Michael A. Springs

(57) ABSTRACT

A system (e.g., one or more computer systems) of synchronous orchestration may store and/or replay one or more operations of a synchronous orchestration operation if one or more issues impair the synchronous orchestration operation. For example, the system may replay and/or reproduce a task of the synchronous orchestration operation after an amount of time transpires and/or after receiving a notification that indicates an impairment has been overcome. For instance, a replay and/or reproduction process to begin from a point where an orchestration layer was impaired. In one or more embodiments, one or more efforts in repeating an entire synchronous orchestration operation may be reduced.

15 Claims, 7 Drawing Sheets

(56) References Cited

U.S. PATENT DOCUMENTS

2014/0029751 A1* 1/2014 Swineford .......... G06F 21/6218
380/279
2014/0162663 A1* 6/2014 Shaw ................ H04W 28/0226
455/445
2015/0347792 A1* 12/2015 Bucherer-Klingler .......................
G06K 7/10297
340/10.1

* cited by examiner

OPERATING DISTRIBUTED COMPUTER SYSTEMS

CROSS-REFERENCE TO RELATED APPLICATIONS

This application is a continuation of U.S. patent application Ser. No. 15/675,890 filed Aug. 14, 2017, by Kamaljeet Singh Bedi et al., and entitled "Operating Distributed Computer Systems," which is incorporated herein by reference.

TECHNICAL FIELD

Certain embodiments of this disclosure relate generally to processing information via distributed computer systems.

BACKGROUND

Networks allow users to access various types of computing resources, which may include hardware resources and/or software resources. Examples of hardware resources include computer networks, servers, memory, and so on. Examples of software resources include applications, services, data, and so on. The computing resources may be used to process transactions. Data stores and databases can support various data types including traditional file, video, images, etc. within a name space leading to new opportunities and innovations. These data stores can have virtually unlimited storage capacity with extremely high durability and availability along with low costs leading to widespread adoption.

SUMMARY

In one or more embodiments, a system (e.g., one or more computer systems) of synchronous orchestration may store and/or replay one or more operations of a synchronous orchestration operation if one or more issues impair the synchronous orchestration operation. For example, the system may replay and/or reproduce a task of the synchronous orchestration operation after an amount of time transpires and/or after receiving a notification that indicates an impairment has been overcome. For instance, a replay and/or reproduction process to begin from a point where an orchestration layer was impaired may be utilized, which may provide one or more advantages over reinitiating a synchronous orchestration operation from its beginning and duplicating all successful steps up to a point of failure. In one or more embodiments, reducing any repetition of steps of a synchronous orchestration operation may provide and/or implement one or more advantages. For example, retrying a failed transaction from a point of failure may reduce repetition of one or more steps of a synchronous orchestration operation may provide and/or implement one or more advantages over repeating the entire synchronous orchestration operation.

In one or more embodiments, one or more operations may involve multiple computer systems to perform one or more tasks (e.g., processes). For example, the computer systems operate via different platforms in a service oriented architecture. In one or more embodiments, first information may be received via multiple communicatively coupled computer systems. For example, the first information may be received by a computer system of the multiple communicatively coupled computer systems. In one or more embodiments, each of the multiple communicatively coupled computer systems may include one or more computer systems. The multiple communicatively coupled computer systems may process the first information in a synchronous fashion. For example, the multiple communicatively coupled computer systems may process the first information via a synchronous orchestration. In one or more embodiments, second information, different from the first information, may be received via the multiple communicatively coupled computer systems. For example, the second information may be received by a computer system of the multiple communicatively coupled computer systems.

In one or more embodiments, at least one communication issue between two of the multiple communicatively coupled computer systems may be determined. For example, coupling the computer systems to perform the one or more tasks may pose one or more challenges. In one or more embodiments, one or more of the computer systems and/or one or more networks, coupling two or more of the computer systems, may incur one or more issues that may impair performing the one or more tasks. For example, the one or more issues may impair a synchronous orchestration. For instance, impairing a portion of a synchronous orchestration may void an entire synchronous orchestration operation. In one or more embodiments, an acknowledgement of receiving the second information may be provided. For example, at least one of the multiple communicatively coupled computer systems may provide the acknowledgement of receiving the second information. In one or more embodiments, the acknowledgement may be provided based at least on receiving the second information and/or based at least on determining the at least one communication issue.

In one or more embodiments, a first computer system of the at least two respective communicatively coupled computer systems of the multiple communicatively coupled computer systems may perform a first process of the at least two different processes with the second information, which may produce first processed information, and the first computer system may store the first processed information. The first system may provide the first processed information to a second computer system, different from the first computer system, of the at least two respective computer systems associated with a second process, different from the first process, of the at least two different processes. In one or more embodiments, the first system may provide the first processed information to the second computer system after a period of time transpires. For example, the period of time may be associated with at least one network delay. For instance, the at least one network delay may include one or more of a network outage, network congestion, network overload, equipment failure, and a configuration error, among others.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
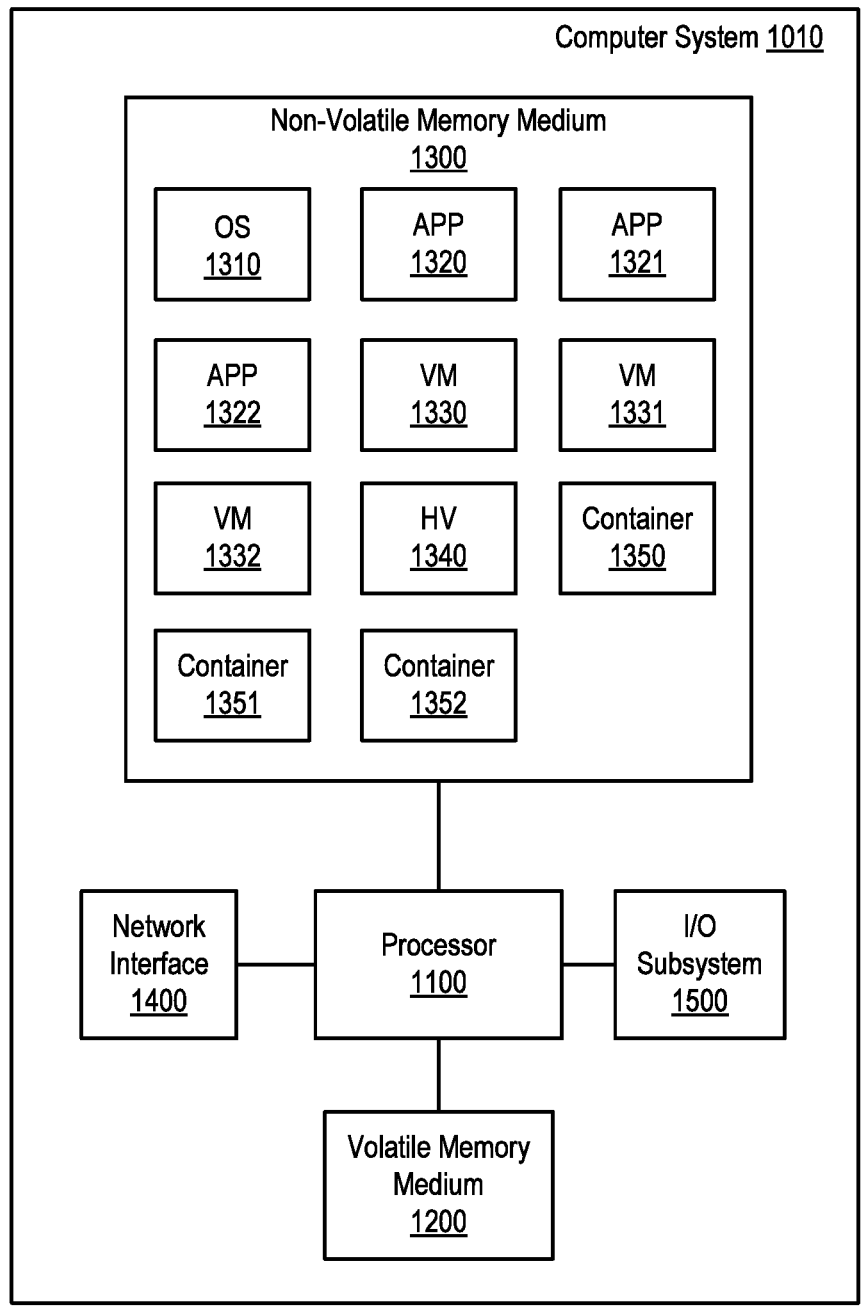
FIG. 1 illustrates an exemplary computer system is illustrated, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral followed by a letter refers to a specific instance of an element and the numeral only form of the reference numeral refers to the collective element. Thus, for example, device '12A' refers to an instance of a device class, which may be referred to collectively as devices '12' and any one of which may be referred to generically as a device '12'.

In one or more embodiments, one or more systems that may be utilized in with orchestration operations may be configured to accommodate one or more delays and/or one or more error conditions that may occur during execution of the orchestration operations. For example, an orchestration operation may include multiple processes across multiple computer systems, and a delay or an error condition in communication between two computer systems of the multiple computer systems may occur. For instance, a first computer system of the two computer systems may store results of a process, due to a delay or an error condition in communication, and provide the results of the process to a second computer system of the two computer systems when the error condition is resolved or after a period of time transpires.

In one or more embodiments, one or more operations may involve multiple computer systems to perform one or more tasks (e.g., processes). For example, the computer systems may operate via different platforms in a service oriented architecture. For instance, coupling the computer systems to perform the one or more tasks may pose one or more challenges. In one or more embodiments, one or more of the computer systems and/or one or more networks, coupling two or more of the computer systems, may incur one or more issues that may impair performing the one or more tasks. For example, the one or more issues may impair a synchronous orchestration. For instance, impairing a portion of a synchronous orchestration may void an entire synchronous orchestration operation.

In one or more embodiments, a system (e.g., a computer system) of synchronous orchestration may store and/or replay one or more operations of a synchronous orchestration operation if one or more issues impair the synchronous orchestration operation. For example, the system may replay and/or reproduce a task of the synchronous orchestration operation after an amount of time transpires and/or a notification, that indicates an impairment has been overcome, is received. For instance, a replay and/or reproduction process to begin from a point where an orchestration layer was impaired. In one or more embodiments, one or more efforts in repeating an entire synchronous orchestration operation may be reduced.

Turning now to FIG. 1, an example of a computer system is illustrated, according to one or more embodiments. As shown, a computer system 1010 may include a processor 1100, a volatile memory medium 1200, a non-volatile memory medium 1300, a network interface 1400, and an input/output (I/O) subsystem 1500. As illustrated, volatile memory medium 1200, non-volatile memory medium 1300, network interface 1400, and I/O subsystem 1500 may be communicatively coupled to processor 1100.

As shown, non-volatile memory medium 1300 may include an operating system (OS) 1310, applications (APPs) 1320-1322, virtual machines (VMs) 1330-1332, a hypervisor (HV) 1340, and containers 1350-1352. In one or more embodiments, one or more of OS 1310, APPs 1320-1322, VMs 1330-1332, HV 1340, and containers 1350-1352 may include instructions executable by processor 1100. In one example, processor 1100 may execute instructions of one or more of OS 1310, APPs 1320-1322, VMs 1330-1332, HV 1340, and containers 1350-1352 via non-volatile memory medium 1300. In another example, one or more portions of the instructions of the one or more of OS 1310, APPs 1320-1332, VMs 1330-1332, HV 1340, and containers 1350-1352 may be transferred to volatile memory medium 1200, and processor 1100 may execute the one or more portions of the instructions of the one or more of OS 1310, APPs 1320-1332, VMs 1330-1332, HV 1340, and containers 1350-1352 via volatile memory medium 1200.

In one or more embodiments, HV 1340 may include one or more of software, firmware, and hardware that creates and executes one or more VMs (e.g., one or more of VMs 1330-1332). For example, computer system 1010 may be considered host machine when HV 1340 executes and one or more of VMs 1330-1332 are executed via HV 1340. For instance, a virtual machine (VM) (e.g., a VM of VMs 1330-1332) may be considered a guest machine. In one or more embodiments, a VM may provide one or more structures and/or functionalities as those described with reference to computer system 1010 (e.g., singularly or via nesting of hypervisors and virtual machines). In one example, the VM may provide emulated devices to a guest OS that executes via the VM. In another example, the VM may provide hardware devices to the guest OS that executes via the VM. In one instance, the guest OS may access hardware in a pass-through configuration. In another instance, the guest OS may access hardware in a single root input/output virtualization (SR-MY) configuration. In one or more embodiments, guest operating systems may share one or more devices of a host machine. For example, the guest operating systems may share one or more of a network adapter via virtual network adapters and a storage device via a virtual storage devices (e.g., virtual disks, virtual memory, etc.), among others.

In one or more embodiments, OS level virtualization may be utilized. For example, OS level virtualization may include a kernel of an OS that permits multiple isolated user space instances of collections of processes (e.g., programs, applications, services, etc.). For instance, these instances are often referred to as "containers", "software containers", "virtualization engines", or "jails" (e.g., FreeBSD jails, chroot jails, etc.). In one or more embodiments, with OS level virtualization, an OS may behave and/or may appear like multiple different, individual computer systems. For example, little to no overhead may be imposed by OS level virtualization, as processes in OS level virtual partitions may utilize a single system call interface of an OS. For instance, OS level virtual partitions may not be subjected to emulation or be executed via virtual machines. In one or more embodiments, OS level virtualization may be utilized in consolidating computer system hardware or virtual machines by moving services on separate hosts or virtual machines into containers on a computer system or single virtual machine.

In one or more embodiments, a container may be or include software in a file system that includes one or more of instructions executable by a processor (e.g., a program, software, an application, server software, a service, etc.), one or more runtime libraries, one or more system tools, and one or more system libraries, among others. For example, a container may be or include a Docker container, a LXC, or a Kubernetes pod, among others. In one or more embodiments, a container may provide and/or may implement operating system-level virtualization via a virtual environment that includes a separate process space and/or a separate network space, rather than creating and/or implementing a virtual machine.

In one or more embodiments, a container may be or include a pod (e.g., a Kubernetes pod). For example, a pod may provide and/or add a higher level of abstraction to one or more containerized elements. For instance, a pod may include one or more containers that may be warranted to be co-located and/or executed on a computer system (e.g., a host computer system, host machine, etc.) and may share resources of the computer system. In one or more embodiments, a thick container may be or include a pod, and a thin container may include a single container.

In one or more embodiments, containers may provide and/or offer an immutable quality and/or option. For example, a container may be deployed, destroyed, modified, re-constructed and/or re-created, and re-deployed. In one instance, instructions, executable by a processor, of a container may not be modified while the container is executing. In another instance, instructions, executable by a processor, of a container may not be modified once the container is created.

In one or more embodiments, the term "memory medium" may mean a "memory device", a "memory", a "storage device", a "tangible computer readable storage medium", and/or a "computer-readable medium". In one example, a memory medium may be a volatile memory medium. For instance, the volatile memory medium may lose stored data when the volatile memory medium no longer receives power. In a second example, a memory medium may be a non-volatile memory medium. For instance, the non-volatile memory medium may not lose stored data when the volatile memory medium no longer receives power or when power is not applied. In another example, a memory medium may include a volatile memory medium and a non-volatile memory medium.

In one or more embodiments, a volatile memory medium may include volatile storage. For example, the volatile storage may include random access memory (RAM), dynamic RAM (DRAM), static RAM (SRAM), and/or extended data out RAM (EDO RAM), among others. In one or more embodiments, a non-volatile memory may include non-volatile storage. For example, the non-volatile storage may include read only memory (ROM), programmable ROM (PROM), erasable PROM (EPROM), electrically erasable PROM (EEPROM), a magnetic storage medium (e.g., a hard drive, a floppy disk, a magnetic tape, etc.), ferroelectric RAM (FRAM), flash memory, a solid state drive (SSD), non-volatile RAM (NVRAM), a one-time programmable (OTP) memory, and/or optical storage (e.g., a compact disc (CD), a digital versatile disc (DVD), a BLU-RAY disc (BD), etc.), among others.

In one or more embodiments, I/O subsystem 1500 may include or represent a variety of communication interfaces, graphics interfaces, video interfaces, user input interfaces, and/or peripheral interfaces, among others. For example, I/O subsystem 1500 may include one or more of a touch screen, a display, a display adapter, and a universal serial bus (USB) interface, among others. For instance, a touch screen may include circuitry that enables touch functionality in conjunction with a display that is driven by a display adapter.

In one or more embodiments, network interface 1400 may be configured to be coupled to a network. For example, network interface 1400 may permit computer system 1010 to be communicatively coupled to a network. In one instance, network interface 1400 may be configured to be coupled to a wired network. In a second instance, network interface 1400 may be configured to be coupled to a wireless network. In a second instance, network interface 1400 may be configured to be coupled to an optical network.

In one or more embodiments, one or more of volatile memory medium 1200, non-volatile memory medium 1300, network interface 1400, and I/O subsystem 1500 may be communicatively coupled to processor 1100 via one or more buses. For example, a bus may include one or more of a peripheral component interconnect (PCI) bus, a serial peripheral interface (SPI) bus, an inter-integrated circuit (I²C) bus, an enhanced serial peripheral interface (eSPI) bus, a system management bus (SMBus), a universal serial bus, and a low pin count (LPC) bus, among others. In one or more embodiments, one or more of volatile memory medium 1200, non-volatile memory medium 1300, network interface 1400, and I/O subsystem 1500 may be communicatively coupled to processor 1100 via one or more of a PCI-Express (PCIe) root complex and one or more PCIe switches, among others.

In one or more embodiments, processor 1100 may execute instructions in implementing one or more systems, flowcharts, methods, and/or processes described herein. In one example, processor 1100 may execute processor instructions from one or more of memory media 1200 and 1300 in implementing one or more systems, flowcharts, methods, and/or processes described herein. In another example, processor 1100 may execute instructions received via network interface 1400 in implementing one or more systems, flowcharts, methods, and/or processes described herein.

In one or more embodiments, processor 1100 may include circuitry that may interpret and/or execute program instructions and/or process data, among others. For example, processor 1100 may include one or more of a system, a device, and an apparatus that may interpret and/or execute program instructions and/or process data, among others. For instance, processor 1100 may include one or more of a central processing unit (CPU), a microprocessor, a graphics processing unit (GPU), an application processor, a digital signal processor (DSP), and an application specific integrated circuit (ASIC), among others.

Figure 2A:
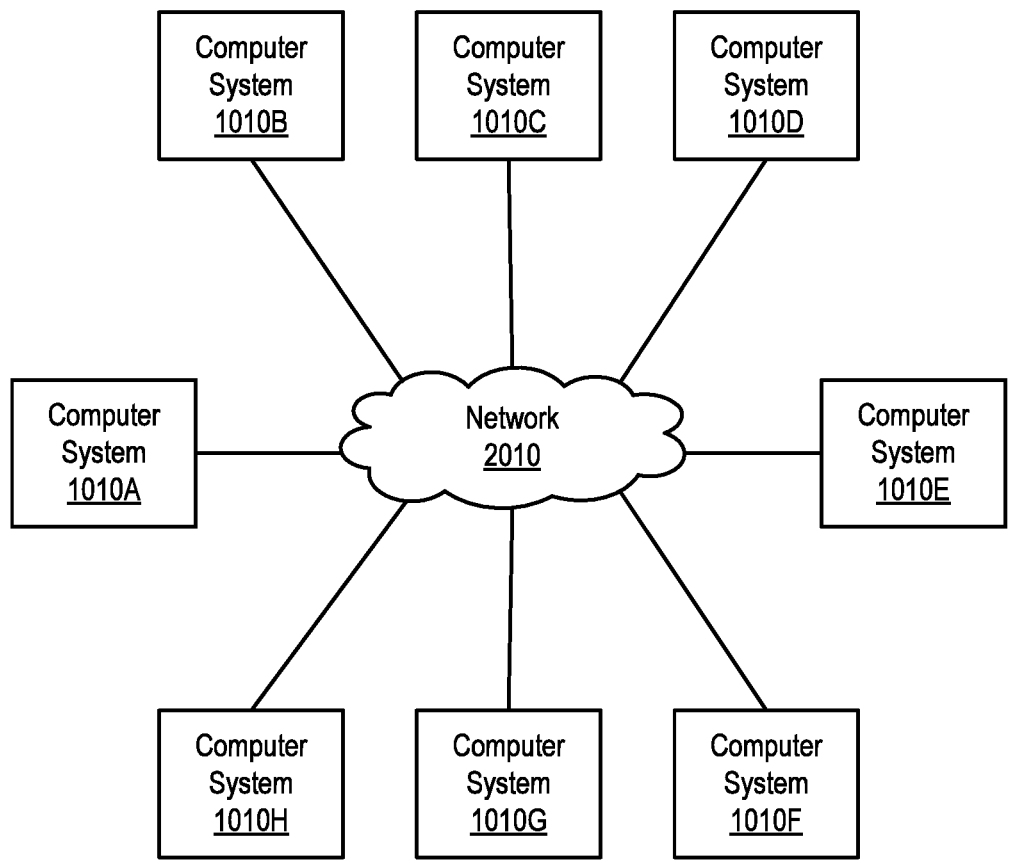
FIG. 2A illustrates an example of computer systems coupled to a network, according to one or more embodiments.

Turning now to FIG. 2A, computer systems coupled to a network are illustrated, according to one or more embodiments. As shown, computer systems 1010A-1010H may be communicatively coupled to a network 2010. In one or more embodiments, network 2010 may include one or more of a wired network, an optical network, and a wireless network. For example, network 2010 may include one or more of a local area network (LAN), a wide area network (WAN), a wireless LAN (WLAN), a metropolitan area network (MAN), a public switched telephone network (PSTN), a public WAN (e.g., an Internet), a private WAN, a cellular telephone network, a satellite telephone network, and a virtual private network (VPN), among others. In one or more embodiments, network 2010 may be coupled to one or more other networks. For example, network 2010 may be coupled to one or more of a LAN, a WAN, a WLAN, a MAN, a PSTN, a public WAN, a private WAN, a cellular telephone network, a satellite telephone network, and a VPN, among others.

Figure 2B:
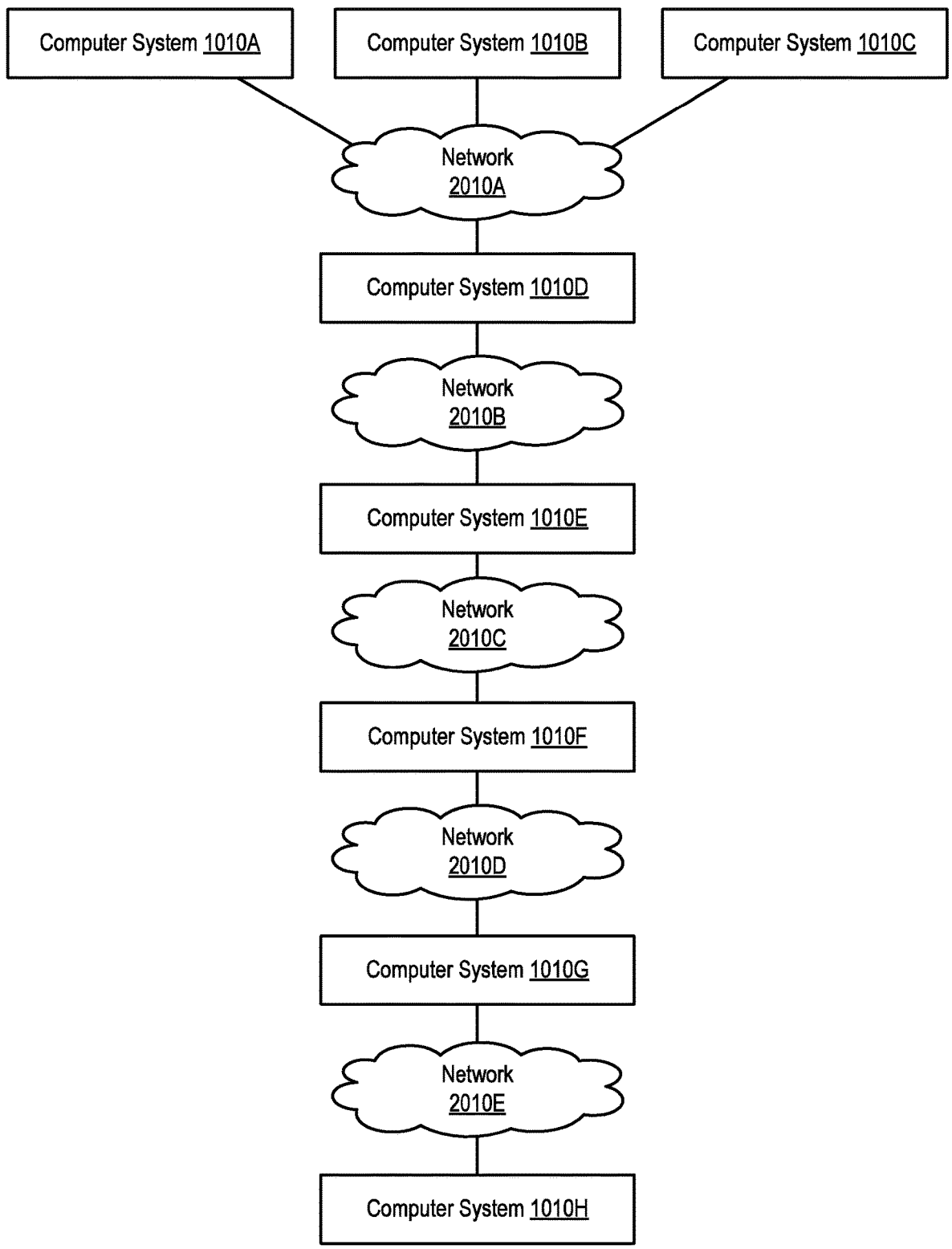
FIG. 2B illustrates an example of computer systems coupled to multiple networks, according to one or more embodiments.

Turning now to FIG. 2B, computer systems coupled to various networks are illustrated, according to one or more embodiments. As shown, computer systems 1010A-1010C may be coupled to a network 2010A. In one or more embodiments, one or more users may operate one or more of computer systems 1010A-1010C. For example, the one or more users may be one or more customers. For instance, the one or more customers may utilize one or more of computer systems 1010A-1010C for one or more transactions.

As illustrated, computer system 1010D may be coupled to network 2010A and a network 2010B; computer system 1010E may be coupled to network 2010B and a network 2010C; computer system 1010F may be coupled to network 2010C and a network 2010D; computer system 1010G may be coupled to network 2010D and a network 2010E; and computer system 1010H may be coupled to network 2010E.

In one or more embodiments, two of more of computer systems 1010D-1010H may be configured to provide a service oriented architecture. In one example, two or more of computer systems 1010D-1010H may be configured to provide respective one or more services of the service oriented architecture. In one instance, a first computer system of computer systems 1010D-1010H may be configured to provide a service of the service oriented architecture. In another instance, a second computer system, different from the first computer system, of computer systems 1010D-1010H may be configured to provide one or more services of the service oriented architecture. In another example, a service within a service oriented architecture may be or include a discrete unit of functionality. In one instance, the service may be accessed remotely. In another instance, the service may be acted upon and/or updated independently.

In one or more embodiments, a service oriented architecture may include one or more attributes. In one example, an attribute of the service oriented architecture may be or include a logical representation of a business activity. For instance, the business activity may be associated with one or more specific outcomes. In a second example, an attribute of the service oriented architecture may be or include a self-containment. In a third example, an attribute of the service oriented architecture may be or include an opacity. For instance, the service oriented architecture may be a "black box" for and/or to its consumers. In another example, an attribute of the service oriented architecture may be or include one or more underlying services. In one or more embodiments, one or more services of a service oriented architecture may be utilized in providing one or more functionalities of an application. For example, the application may be or include a software application. In one instance, the software application may be distributed between or among two or more computer systems. In another instance, the software application may be loosely coupled between or among two or more computer systems In one or more embodiments, services of a service oriented architecture may utilize one or more protocols that describe how data is transferred from one service to another service and/or that describe how data is parsed, utilizing description metadata. For example, a data description language may be utilized. In one instance, the data description language may be or include a markup language (e.g., a hypertext markup language (HTML), an extensible markup language (XML), etc.). In another instance, the data description language may be or include a JavaScript object notation (JSON). In one or more embodiments, the metadata may describe one or more functional characteristics of a service and/or may describe one or more characteristics of one or more qualities of service, among others.

Figure 3A:
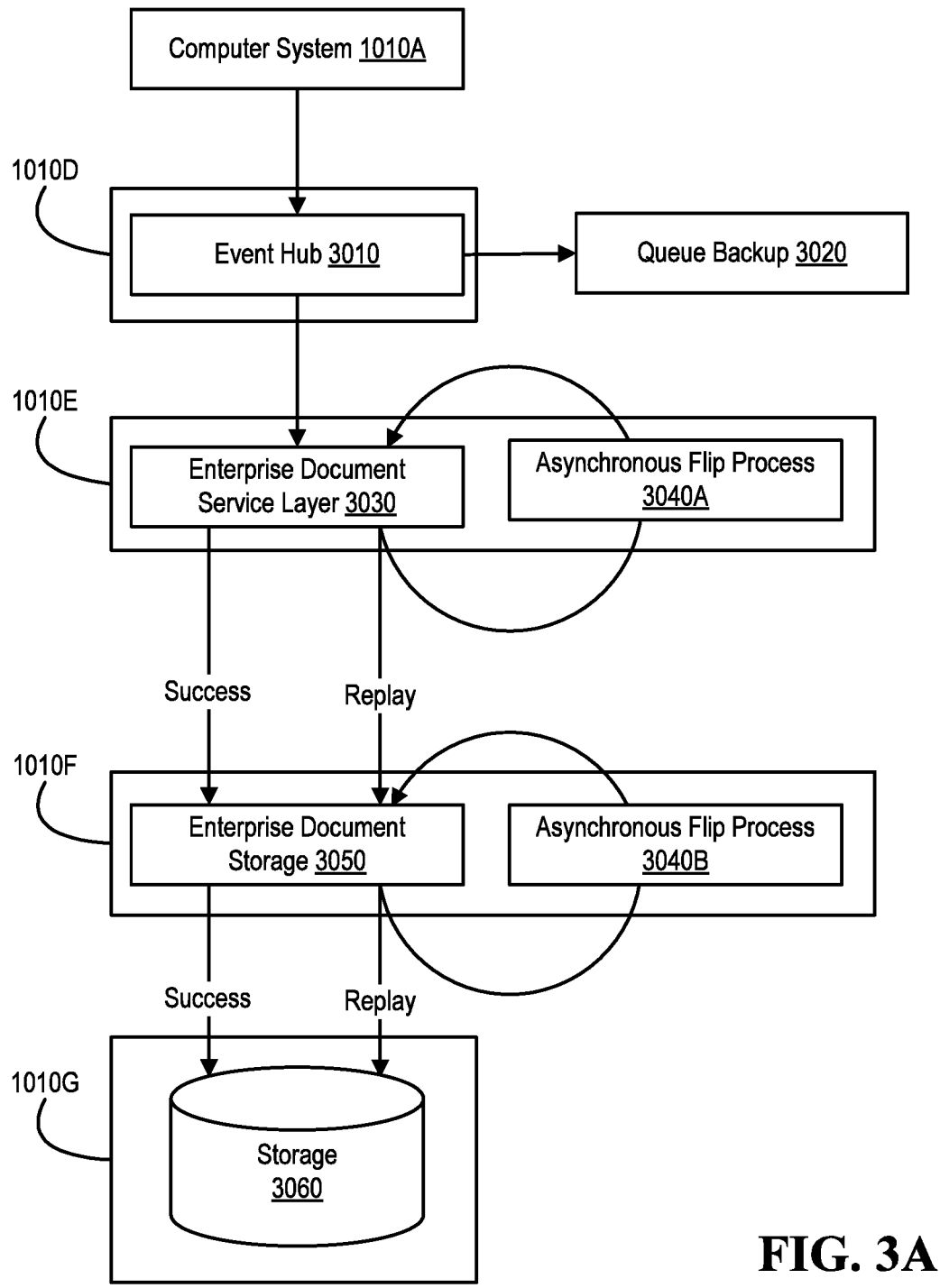
FIG. 3A illustrates an example of an envelope create orchestration, according to one or more embodiments.

Turning now to FIG. 3A, an example of an envelope create orchestration is illustrated, according to one or more embodiments. In one or more embodiments, two or more of computer systems 1010D-1010G may perform one or more orchestration tasks. In one or more embodiments, an event hub 3020 may receive a document (e.g., an eDocument) from computer system 3010A. For example, computer system 1010D may include event hub 3020. In one or more embodiments, if event hub 3020 receives more documents that it may process in a period of time, event hub 3020 may store documents via a queue backup 3030. For example, event hub 3020 may retrieve documents from queue backup 3030, when a processing load permits, and process the retrieved documents.

In one or more embodiments, an enterprise document service layer 3030 may receive a document (e.g., an eDocument) and may combine the document with an envelope. In one example, the envelope may include one or more customer attributes (e.g., a name, an address, an email address, a telephone number, an identification number, etc.), which may be combined with a document (e.g., an eDocument). In another example, the envelope may include one or more names of people (e.g., recipients) that need to sign an eDocument. In one or more embodiments, enterprise document service layer 3030 may create an envelope/document combination for signing. As illustrated, computer system 1010E may include enterprise document service layer 3030.

In one or more embodiments, enterprise document service layer 3030 may attempt to provide an envelope/document combination to an enterprise document storage 3050. If enterprise document service layer 3030 is not successful in providing the envelope/document combination to enterprise document storage 3050, enterprise document service layer 3030 may utilize an asynchronous flip process 3040A. For example, asynchronous flip process 3040A may store the envelope/document combination and may attempt to provide the envelope/document combination after a period of time transpires. For instance, providing the envelope/document combination after the period of time transpires may include a replay of the attempt to provide the envelope/document combination to enterprise document storage 3050.

In one or more embodiments, enterprise document storage 3050 may receive an envelope/document combination and attempt to store the envelope/document combination to a storage 3060. As illustrated, computer system 1010G may include storage 3060. If enterprise document storage 3050 is not successful in storing the envelope/document combination to storage 3060, enterprise document storage 3050 may utilize an asynchronous flip process 3040B. For example, asynchronous flip process 3040B may store the envelope/document combination and may attempt to store the envelope/document combination after a period of time transpires. For instance, storing the envelope/document combination after the period of time transpires may include a replay of the attempt to store the envelope/document combination to storage 3060. In one or more embodiments, storage 3060 may be or include a database.

Figure 3B:
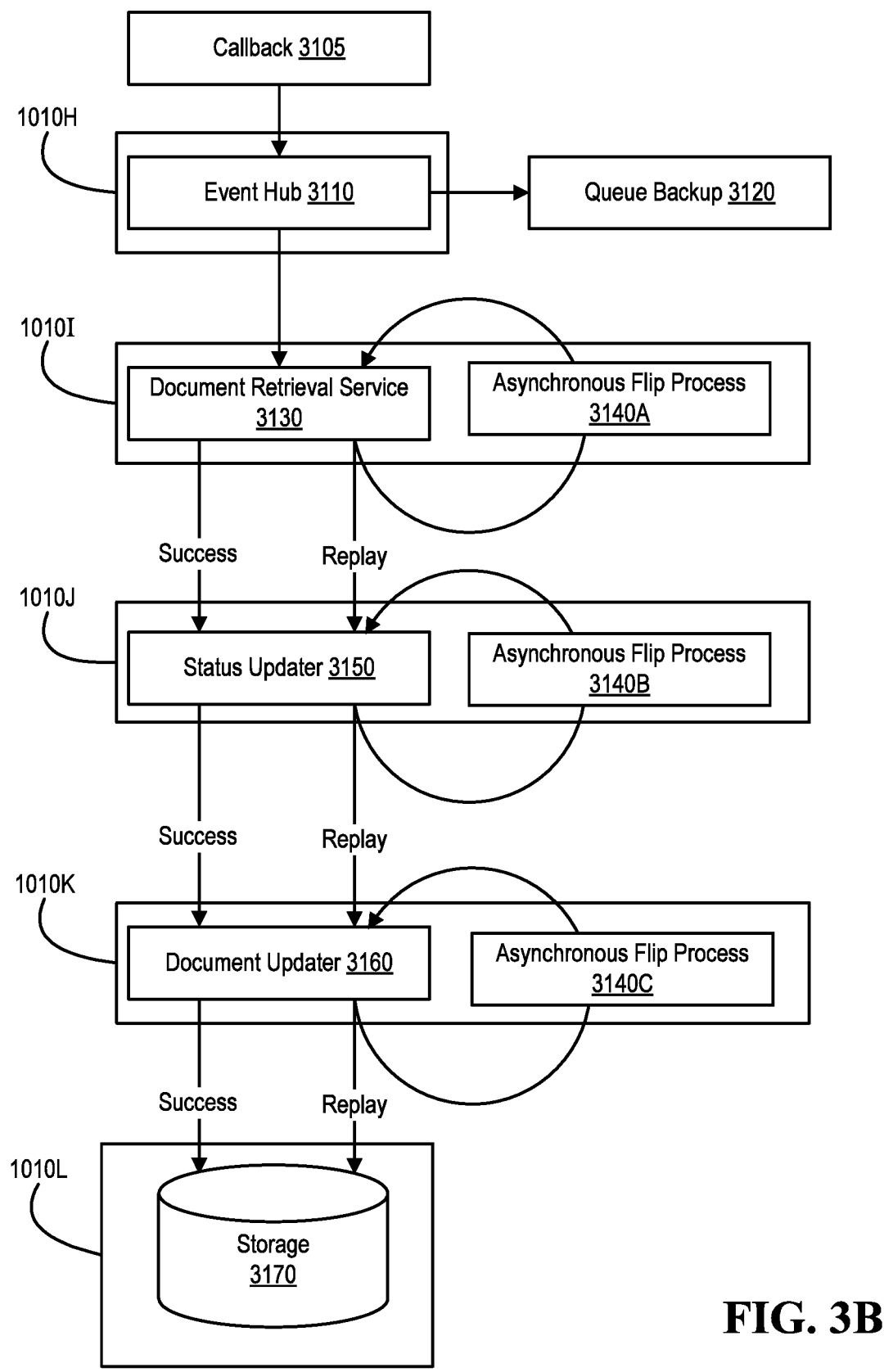
FIG. 3B illustrates an example of a document orchestration, according to one or more embodiments.

Turning now to FIG. 3B, an example of a document orchestration is illustrated, according to one or more embodiments. In one or more embodiments, two or more of computer systems 1010H-1010L may perform one or more orchestration tasks. In one or more embodiments, a callback 3105 may be received by an event hub 3110. In one example, callback 3105 may include delivery information. For instance, the delivery information may indicate that a document (e.g., an eDocument) has been emailed to a recipient of the document. In a second example, callback 3105 may include commencement information. In one instance, the commencement information may indicate that a recipient of the document has opened the document. In another instance, the commencement information may indicate that a recipient of the document has opened an envelope associated with the document. In another example, callback 3105 may include signature information. In one instance, the signature information may include an eSignature. In another instance, the signature information may include a document ID (e.g., a document ID that may correspond to an eSignature). In one or more embodiments, callback 3105 may include an envelope and/or any information associated with an envelope.

In one or more embodiments, if event hub 3110 receives more callbacks that it may process in a period of time, event hub 3110 may store requests via a queue backup 3120. For example, event hub 3110 may retrieve one or more callbacks 3105 from queue backup 3120, when a processing load permits, and process the callbacks. In one or more embodiments, event hub 3110 may provide callback 3105 to a document retrieval service 3130. For example, document retrieval service 3130 may retrieve a document (e.g., an eDocument) from a document storage service. For instance, the document storage service may be an eDocument service like or such as Docusign, among others.

In one or more embodiments, document retrieval service 3130 may attempt to provide a document to a status updater 3150. If document retrieval service 3130 is not successful in providing the document to status updater 3150, document retrieval service 3130 may utilize an asynchronous flip process 3140A. For example, asynchronous flip process 3140A may store the document and may attempt to provide the document after a period of time transpires. For instance, providing the document after the period of time transpires may include a replay of the attempt to provide the document to status updater 3150.

In one or more embodiments, an asynchronous flip process 3140 may be performed automatically. For example, asynchronous flip process 3140 may be performed in response to an unsuccessful deliver of information from one computer system to another computer system. For instance, there may be no manual intervention in performing asynchronous flip process 3140. In one or more embodiments, asynchronous flip process 3140 may be performed until information is successfully transferred from one computer system to another computer system. For example, replaying and/or reproducing a task of a synchronous orchestration operation until information is successfully transferred from one computer system to another computer system may permit a service level agreement (SLA) associated with a synchronous orchestration to be achieved and/or accomplished.

In one or more embodiments, status updater 3150 may update a status of a document (e.g., a document retrieved via the eDocument service). For example, updating a status of a document may include updating a version of a document. For instance, updating a status of a document may include creating a new version of the document. In one or more embodiments, multiple versions of the document may be created. For example, a version of the multiple versions of the document may be associated with a signature of a person signing the document. For instance, a version may be created for each person signing the document.

In one or more embodiments, status updater 3150 may attempt to provide an envelope/document combination to a document updater 3160. If status updater 3150 is not successful in providing the envelope/document combination to document updater 3160, status updater 3150 may utilize an asynchronous flip process 3140B. For example, asynchronous flip process 3140B may store the envelope/document combination and may attempt to provide the envelope/document combination after a period of time transpires. For instance, providing the envelope/document combination after the period of time transpires may include a replay of the attempt to provide the envelope/document combination to document updater 3160. In one or more embodiments, document updater 3160 may update a signed version of a document with metadata. For example, the metadata may include information, such as what type of document, a number of pages of the document, version information, etc.

In one or more embodiments, document updater 3160 may attempt to store the updated document to a storage 3170. As illustrated, computer system 1010L may include storage 3170. If document updater 3160 is not successful in storing the updated document to storage 3170, document updater 3160 may utilize an asynchronous flip process 3140C. For example, asynchronous flip process 3140C may store the updated document and may attempt to store the updated document after a period of time transpires. For instance, storing the updated document after the period of time transpires may include a replay of the attempt to store the updated document to storage 3170. In one or more embodiments, storage 3170 may be or include a database.

Figure 4:
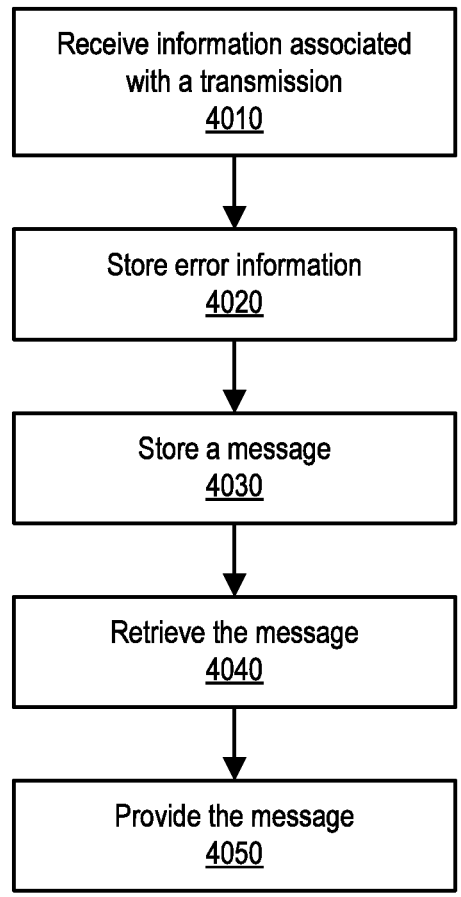
FIG. 4 illustrates an example of an asynchronous flip process, according to one or more embodiments.

Turning now to FIG. 4, an asynchronous flip process is illustrated, according to one or more embodiments. At 4010, information associated with a transmission may be received. For example, the transmission may be from a first computer system to a second computer system. In one or more embodiments, the information associated with the transmission may include a message and error information. For example, the error information may include information associated with an error in transmitting the message from the first computer system to the second computer system. For instance, the error in transmitting the message from the first computer system to the second computer system may include one or more of a network delay, a network outage, network congestion, network overload, equipment failure, and a configuration error, among others. At 4020, the error information may be stored. For example, the error information may be associated with the transmission. For instance, the error information may be stored via a database. At 4030, the message may be stored. In one example, the message may be stored via a queue. In another example, the message may be stored via a database.

At 4040, the message may be retrieved. In one example, the message may be retrieved via a queue. In another example, the message may be retrieved via a database. In one or more embodiments, an amount of time may transpire before the message may be retrieved. In one example, the amount of time may be predetermined. For instance, a countdown clock may expire before the message may be retrieved. In another example, information may be received that indicates that the message may be retrieved. In one instance, the information that may be received that indicates that the message may be retrieved may include an indication that an error condition has been voided and/or fixed. In another instance, the information that may be received that indicates that the message may be retrieved may include an indication communications with the second computer system is possible and/or permitted.

At 4050, the message may be provided. For example, the message may be provided to the second computer system. In one or more embodiments, providing the message may include a performing replay process. For example, the message may be provided to the second computer system in a fashion as or similar to a first time the message was attempted to be provided to the first computer system.

Figure 5:
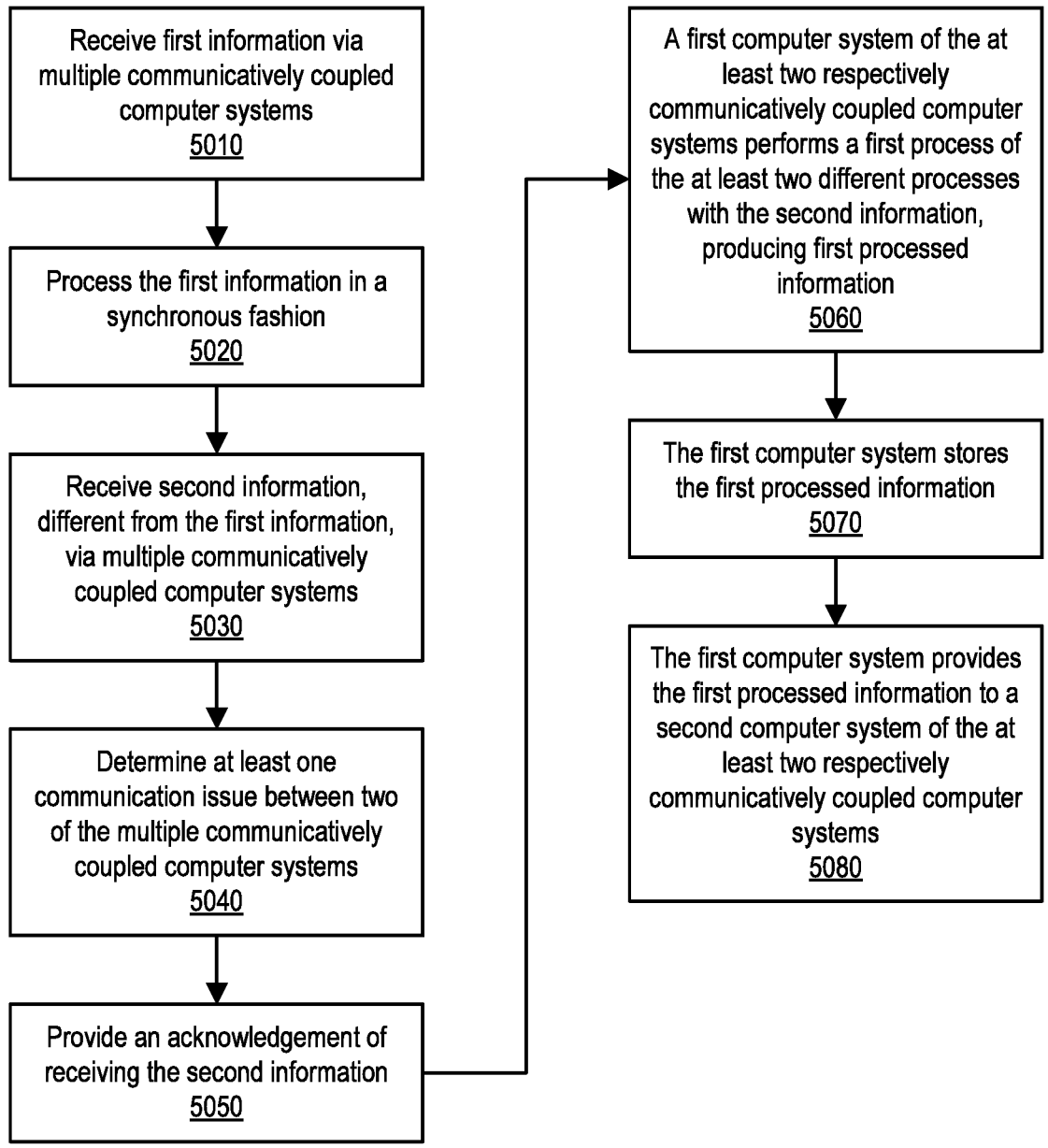
FIG. 5 illustrates an example of a method of operating computer systems, according to one or more embodiments.

Turning now to FIG. 5, an example of a method of operating computer systems is illustrated, according to one or more embodiments. At 5010, first information may be received via multiple communicatively coupled computer systems. For example, the first information may be received by a computer system of the multiple communicatively coupled computer systems. In one or more embodiments, each of the multiple communicatively coupled computer systems may include one or more computer systems. For example, the one or more computer systems may include one or more functionalities and/or one or more structures as those described with reference to computer system 1010. In one or more embodiments, the multiple communicatively coupled computer systems may be configured to provide a service oriented architecture that includes at least two different processes associated with at least two respective communicatively coupled computer systems of the multiple communicatively coupled computer systems.

At 5020, the multiple communicatively coupled computer systems may process the first information in a synchronous fashion. For example, the multiple communicatively coupled computer systems may process the first information via a synchronous orchestration. At 5030, second information, different from the first information, may be received via the multiple communicatively coupled computer systems. For example, the second information may be received by a computer system of the multiple communicatively coupled computer systems.

At 5040, at least one communication issue between two of the multiple communicatively coupled computer systems may be determined. In one example, it may be determined that the two of the multiple communicatively coupled computer systems may not be able to communicate information. For instance, a first computer system of the two of the multiple communicatively coupled computer systems may determine that the two of the multiple communicatively coupled computer systems may not be able to communicate information. In another example, it may be determined that the two of the multiple communicatively coupled computer systems may not be able to communicate information at a sufficient communication rate. For instance, it may be determined that the two of the multiple communicatively coupled computer systems may not be able to communicate information at a sufficient communication rate that may permit a synchronous orchestration of processing.

At 5050, an acknowledgement of receiving the second information may be provided. For example, at least one of the multiple communicatively coupled computer systems may provide the acknowledgement of receiving the second information. In one instance, the at least one of the multiple communicatively coupled computer systems may provide the acknowledgement of receiving the second information to a computer system (e.g., a computer system of computer systems 1010A-1010C) that provided the second information. In another instance, the first computer system of the two of the multiple communicatively coupled computer systems may determine that the two of the multiple communicatively coupled computer systems may provide the acknowledgement of receiving the second information to a computer system (e.g., a computer system of computer systems 1010A-1010C) that provided the second information. In one or more embodiments, the acknowledgement may be provided based at least on receiving the second information and/or based at least on determining the at least one communication issue.

At 5060, the first computer system of the at least two respective communicatively coupled computer systems of the multiple communicatively coupled computer systems may perform a first process of the at least two different processes with the second information, which may produce first processed information. In one example, computer system 1010D may perform the first process of the at least two different processes with the second information, which may produce the first processed information. In another example, computer system 1010J may perform the first process of the at least two different processes with the second information, which may produce the first processed information.

At 5070, the first computer system may store the first processed information. In one example, computer system 1010D may store the first processed information. In another example, computer system 1010J may store the first processed information. In one instance, the first computer system may store the first processed information for at least a period of time. In another instance, the first computer system may store the first processed information via a queue. In one or more embodiments, the first computer system may store the first processed information based at least on or in response to determining the at least one communication issue.

At 5080, the first system may provide the first processed information to a second computer system, different from the first computer system, of the at least two respective computer systems of the multiple communicatively coupled computer systems associated with a second process, different from the first process, of the at least two different processes. In one example, computer system 1010D may provide the first processed information to computer system 1010E. For instance, computer system 1010D may provide the first processed information to computer system 1010E via network 2010B. In one example, computer system 1010J may provide the first processed information to computer system 1010K. For instance, computer system 1010J may provide the first processed information to computer system 1010J via a network. In another example, the second information may include a signature. For instance, the signature may be or include an eSignature.

In one or more embodiments, the first computer system may provide the first processed information to the second computer system after a period of time transpires. For example, the period of time may be associated with at least one network delay. For instance, the at least one network delay may include one or more of a network outage, network congestion, network overload, equipment failure, and a configuration error, among others. In one or more embodiments, the first computer system may store the first processed information via a queue, and the first computer system may dequeue the processed information and may provide the first processed information to the second computer system. For example, the first computer system may dequeue the first processed information after the period of time transpires.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system, comprising:
a plurality of communicatively coupled computer systems, configured to:
provide at least two different processes associated with at least two respective computer systems of the plurality of communicatively coupled computer systems, wherein the at least two different processes form a synchronous orchestration operation;
receive first information by each of the plurality of communicatively coupled computer systems;
process the first information in a synchronous fashion by each of the plurality of communicatively coupled computer systems; and
receive second information by each of the plurality of communicatively coupled computer systems, wherein the second information is different from the first information;
wherein the plurality of communicatively coupled computer systems comprises:
a first computer system and a second computer system, the first computer system configured to:
perform a first process of the at least two different processes with the second information, to produce first processed information;
determine that the first computer system cannot communicate with the second computer system based at least in part upon a communication issue that is associated with a period of time, wherein the communication issue impairs one or more operations of the synchronous orchestration;
store the first processed information in response to determining the communication issue; and
provide, after the period of time transpires, the first processed information to the second computer system, wherein:
the second computer system is different from the first computer system;
the second computer system is associated with a second process of the at least two different processes in the synchronous orchestration operation; and
the second process is different from the first process; and
the second computer system configured to:
perform the second process with the first processed information.

2. The system of claim 1, wherein the period of time is associated with at least one network delay.

3. The system of claim 1, wherein the second information includes a signature.

4. The system of claim 1, wherein the first computer system is further configured to store the first processed information for at least the period of time.

5. The system of claim 4,
wherein, to store the first processed information for at least the period of time, the first computer system is further configured to store the first processed information via a queue; and
wherein the first computer system is further configured to dequeue the first processed information after the period of time transpires.

6. A method, comprising:
providing, by a plurality of communicatively coupled computer systems, at least two different processes associated with at least two respective computer systems of the plurality of communicatively coupled computer systems, wherein the at least two different processes form a synchronous orchestration operation;
receiving, by each of the plurality of communicatively coupled computer systems, first information;
processing, by each of the plurality of communicatively coupled computer systems, the first information in a synchronous fashion;
receiving, by each of the plurality of communicatively coupled computer systems, second information, wherein the second information is different from the first information;
performing, by a first computer system of the plurality of communicatively coupled computer systems, a first process of the at least two different processes with the second information, producing first processed information;
determining that the first computer system cannot communicate with the second computer system based at least in part upon a communication issue that is associated with a period of time, wherein the communication issue impairs one or more operations of the synchronous orchestration;
storing the first processed information in response to determining the communication issue;
providing, by the first computer system, the first processed information to the second computer system after the period of time transpires, wherein:
the second computer system is different from the first computer system;
the second computer system is associated with a second process of the at least two different processes in the synchronous orchestration operation; and
the second process is different from the first process; and
performing, by the second computer system, the second process with the first processed information.

7. The method of claim 6, wherein the period of time is associated with at least one network delay.

8. The method of claim 6, wherein the second information includes a signature.

9. The method of claim 6, further comprising:
storing, by the first computer system, the first processed information for at least the period of time.

10. The method of claim 9, wherein storing the first processed information includes storing the first processed information via a queue; and the method further comprises after the period of time transpires, dequeuing, by the first computer system, the first processed information.

11. A computer-readable non-transitory memory medium that comprises instructions executable by communicatively coupled processors of a system, wherein when the processors execute the instructions, the instructions cause the system to:

provide at least two different processes associated with at least two respective processors of the system, wherein the at least two different processes form a synchronous orchestration operation;

receive first information by each of the plurality of communicatively coupled computer systems;

process the first information in a synchronous fashion by each of the plurality of communicatively coupled computer systems; and receive second information by each of the plurality of communicatively coupled computer systems, wherein the second information is different from the first information;

wherein, when a first processor of the at least two respective processors executes the instructions, the system is further caused to:

perform a first process of the at least two different processes with the second information, to produce first processed information;

determine that the first computer system cannot communicate with the second computer system based at least in part upon a communication issue associated with a period of time, wherein the communication issue impairs one or more operations of the synchronous orchestration;

store the first processed information in response to determining the communication issue;

provide, after the period of time transpires, the first processed information to the second processor, different from the first processor, of the at least two respective processors of the system associated with a second process, different from the first process, of the at least two different processes;

wherein:

the second processor is different from the first processor;

the second processor is associated with a second process of the at least two different processes in the synchronous orchestration operation; and the second process is different from the first process; and wherein, when the second processor of the at least two respective processors executes the instructions, the system is further caused to perform the second process with the first processed information.

12. The computer-readable non-transitory memory medium of claim 11, wherein the period of time is associated with at least one network delay.

13. The computer-readable non-transitory memory medium of claim 11, wherein the second information includes a signature.

14. The computer-readable non-transitory memory medium of claim 11, further comprising instructions that, when executed by the first processor, cause the system to store the first processed information at least the period of time.

15. The computer-readable non-transitory memory medium of claim 11, wherein storing the first processed information comprises storing the first processed information via a queue; and further comprising instructions that, when executed by the first processor, cause the system to dequeue the first processed information after the period of time transpires.

* * * * *